United States Patent Office 3,482,841
Patented Dec. 9, 1969

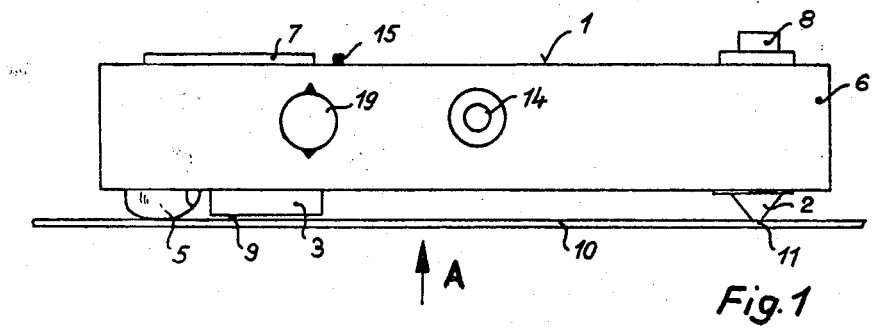

3,482,841
SOUND TRANSDUCER INSTRUMENT
Erich Doring, Moosburg, Germany, assignor to Internationale Patente Establishment, Schaan, Furstentum, Liechtenstein
Filed Nov. 20, 1967, Ser. No. 684,325
Claims priority, application Germany, May 12, 1967, D 53,076
Int. Cl. G11b *3/02, 25/04*
U.S. Cl. 274—9            6 Claims

ABSTRACT OF THE DISCLOSURE

A sound transducer instrument for playing the recorded material on a stationary plate or disk comprising a pivot member supported on and preferably positioned at the center of the disk and having a friction drive wheel and a transducer head secured thereto so that upon a driving of the friction wheel, the transducer head and drive wheel will be driven relative to the stationary disk about the pivot member to reproduce the recorded material.

---

This invention relates to a sound transducer instrument and in particular to a sound recording and/or reproduction instrument comprising a stationary sound record in the form of a plate or sheet and a recording and/or reproduction head rotating about the center of the plate.

Instruments of this kind are already known. They are used for teaching-aid purposes or as a kind of talking storybook, since the sound records can be provided with illustrations so that an associated visual impression can be conveyed at the same time as the acoustic one. The sound records should be as light and handy as possible so as not to make the arrangement as a whole too clumsy. A thin sound record in the form of a plate or sheet will easily become curved if there is any unevenness in the support therefor, in which case the reproduction then becomes defective.

The object of the present invention thus consists in providing a sound transducer instrument of the above-mentioned kind which also works satisfactorily with sound records in the form of thin plates or sheets.

According to the present invention a sound transducer instrument includes a transducer head and a pivot which in use is supported at the center of a stationary sound record in the form of a plate or sheet and a friction drive wheel arranged to cause the head to rotate about said pivot. Preferably, the transducer head is a sound recording and/or reproduction head. This results in the advantage, even in the case of thin sound records of a reliable drive for the tranducer head which drive can be achieved by simple means and is easy to operate.

According to a further feature of the invention, the friction wheel is axially displaceable, so that the speed of revolution of the transducer head can be varied and an acoustically brighter or deeper impression conveyed.

Furthermore, a supporting wheel, in contact with the sound record, can be fitted at the side of the transducer head. This, in an advantageous manner, thus results in a kind of three-point bearing provided by the pivot, the friction drive wheel and the supporting wheel.

The axes of the supporting wheel and of the friction wheel also referred to as driven wheel, are disposed on radial lines extending from the pivot.

The friction wheel, supporting wheel and transducer head can be contained in a housing. The instrument thus has an enclosed form and can be readily inspected and conveniently assembled.

A scale for indicating the axial displacement of the friction wheel can be fitted on the housing, so that the instrument can be set to each required tone quality in a simple manner.

Furthermore, a vertical-action link connection can be provided between the friction wheel, supporting wheel and transducer head, on the one hand, and the pivot on the other. The pivot can be rigidly mounted on the central point of the sound record by means of this link connection, but the friction wheel and the supporting wheel are nevertheless free to move on the sound record, and guide the transducer head in a satisfactory manner.

Embodiments of the invention will now be described in greater detail, by way of example, with reference to the accompanying drawing, in which:

FIGURE 1 shows in side elevation an instrument according to the invention;

FIGURE 2 is a top plan view of the instrument shown in FIGURE 1;

FIGURE 3 is a bottom plan view of the instrument of FIGURE 1 viewed in the direction of the arrow A, the sound record having been removed; and FIGURE 4 is a schematic side elevation of another form of instrument according to the invention, showing a link means.

Referring to the drawing, a sound transducer instrument 1 has a pivot 2, a transducer head 3 such as a recording and/or reproduction head, a friction drive wheel 4, also referred to as driven wheel and friction wheel, and a supporting wheel 5. These parts are contained in a housing 6 in which are also located an upwardly directed loudspeaker 7, a motor for driving the friction wheel 4 and a switch 8 which serves to actuate the motor and the loudspeaker.

The transducer head 3 is provided with a guide 9 which extends into a sound record 10 and thus guides the head along a predetermined tract on the sound record 10. The sound record 10 can also be provided with an indentation 11 into which the pivot 2 is fitted. The friction wheel 4 and the supporting wheel 5 may then revolve about this point. The friction wheel 4 is displaceable on a drive spindle 12, so that the speed of revolution can be adjusted thereby and the required quality of tone obtained. The drive spindle 12 is connected to the drive motor inside the housing 6. This drive spindle 12, a bearing 18 for the movable transducer head 3, and a spindle of the supporting wheel 5 each lie on radial lines extending towards the pivot 2. Externally of the housing 6 and on one side thereof is a scale 13 for reading off the displacement of the friction wheel 4, and an adjusting button 14 for setting the amount of this displacement. A pointer 15, connected to the transducer head 3, projects beyond the upper surface of the housing. If the sound-track on the sound record 10 follows a spiral path, the tranducer head 3 moves towards the pivot 2; this movement can be read off on a scale 16 with the help of the pointer 15; the amount of time available for recording or play-back is thus visually indicated.

To actuate the instrument 1, it is placed on the sound record 10 in such a way that the pivot 2 rests in the indentation 11. Then, by means of a half-turn of a switch 19, the transducer head 3 is lowered so that the guide 9 enters the required track on the sound record 10. The motor and loudspeaker are then switched on through the switch 8. The instrument 1 revolves around the pivot 2 on its driven friction wheel 4 and its supporting wheel 5. The transducer head 3 is guided in the predetermined track of the sound record 10 by way of the guide 9 and effects the required recording or playback. The required quality of sound can be obtained by manipulating the adjusting buttom 14. When the run has finished, a half-turn of the switch 19 raises the transducer head 3 so that it is protected within the housing.

As shown in FIGURE 4, a link 17 can be provided between the central pivot 2 on the one hand and the transducer head 3, the friction wheel 4 and the supporting wheel 5 on the other hand, the axis of which link is parallel with the plane of the sound record 10. If, as a result of unevenness in the base supporting the sound record 10, undulations occur in the latter, the friction wheel 4 and the supporting wheel 5, as well as the transducer head 3 nevertheless revolve satisfactorily about the pivot 2 which in this case is provided with a broader bearing surface than in the previously described embodiment.

The instrument according to the invention is simple to assemble, easy to handle and very reliable in operation. In addition to the switch 8, a further switch can be provided which, for example, switches on the recording means and switches off the play-back. Visual aids or illustrations, synchronized to the acoustic part, can be provided at the side of the sound record 10, so that the instrument can well serve the purpose of a teaching and learning aid, talking story-book, etc.

The embodiments of the invention in which an exclusive property or privilege is claimed are defined as follows:

1. In a sound transducer instrument mountable upon a stationary horizontal surface having a center point, said sound transducer instrument having transducer head means thereon engageable with said surface, the combination comprising:
    an elongated housing having means defining a pivot point at one end thereof mountable at said center point for supporting said one end of said housing above said center point of said surface;
    said transducer head means movably mounted on said housing along a radial line intersecting said means defining a pivot point;
    a supporting wheel rotatably secured to said housing at a fixed location at the other end of said housing and having an axis of rotation intersecting said pivot point means, said supporting wheel engaging said surface to support the other end of said housing above said surface;
    a driven wheel rotatably secured to said housing and located adjacent said other end of said housing, said driven wheel having an axis of rotation intersecting said pivot point means which axis of rotation is arcuately spaced from the axis of rotation of said supporting wheel, said driven wheel engaging said surface for assisting said supporting wheel in supporting said housing above said surface;
    whereby said driven wheel will effect a movement of said housing relative to said surface about said center point to move said transducer head means engaging said surface relative to said surface about said center point.

2. The sound transducer instrument defined in claim 1, in which the transducer head means is one of a sound recording and reproduction head.

3. The sound transducer instrument defined in claim 1, in which the driven wheel is adjustable along said axis of rotation thereof to vary the speed at which said housing moves relative to said surface about said center point.

4. The sound transducer instrument defined in claim 1, in which a vertical action link is connected between the means defining a pivot point at said one end of said elongated housing and the said driven wheel, said supporting wheel and said transducer head means; said link having an axis parallel to the plane of the stationary horizontal surface.

5. The sound transducer instrument defined in claim 3, in which a scale indicating the displacement of said friction wheel along the axis of rotation thereof is mounted on said housing.

6. A sound transducer instrument mountable upon a stationary horizontal surface having a center point, comprising:
    an elongated housing having means defining a pivot point at one end thereof mountable at said center point for supporting said one end of said housing above said center point, a supporting wheel rotatably secured to said housing at a fixed location at the other end thereof and having an axis of rotation intersecting said pivot point means, said supporting wheel engaging said surface to support the other end of said housing above said surface, a driven wheel rotatably secured to said housing and located adjacent said other end of said housing, said driven wheel having an axis of rotation intersecting said pivot point means which axis of rotation is arcuately spaced from the axis of rotation of said supporting wheel, said driven wheel engaging said surface for assisting said supporting wheel in supporting said housing above said surface, said driven wheel being adjustable along said axis of rotation thereof to vary the speed at which said housing moves relative to said surface about said center point;
    transducer head means movably mounted on said housing along a radial line intersecting said pivot point means for movement longitudinally of said housing as said sound transducer instrument moves relative to said surface about said center point, said transducer head means being further supported on said housing for vertical movement relative to said housing and said surface, means on said housing for adjusting said transducer head vertically for effecting an engagement thereof with said surface.

References Cited
UNITED STATES PATENTS

| | | | |
|---|---|---|---|
| 2,568,447 | 9/1951 | Gurewitsch | 274—23 |
| 2,869,877 | 1/1959 | Bard | 274—23 |
| 3,181,870 | 5/1965 | Lasswell | 274—9 |
| 3,360,269 | 12/1967 | Dunn | 274—9 |

LEONARD FORMAN, Primary Examiner

R. A. FIELDS, Assistant Examiner

U.S. Cl. X.R.
274—23